2,836,483

RED LEAD COMPOSITION HAVING IMPROVED FLOW PROPERTIES

William Earle Schulz, Wenonah, N. J., assignor to E. I. du Pont de Nemours and Company, Wilmington, Del., a corporation of Delaware No Drawing. Application November 6, 1953
Serial No. 390,751

5 Claims. (Cl. 52—2)

This invention relates to red lead compositions. More specifically, this invention relates to red lead compositions having improved flowing properties.

Red lead ($Pb_3O_4$) is used in storage battery plates, paints, glass, ceramics, and electric blasting caps. Commerical red lead is generally in the form of a heavy, impalpable, non-free-flowing powder. Because of its poor flowing properties, red lead is difficult, and, at times, hazardous, to handle.

Therefore, an object of the present invention is to provide a process for improving the flowing properties of red lead. Another object of the present invention is to produce a free-flowing red lead composition as a result of the incorporation of a suitable graining agent with red lead. A still further object of this invention is to provide a process for the uniform blending of a graining agent with finely divided red lead. Additional objects will become apparent as the invention is described further.

I have found that the foregoing objects may be accomplished by treating finely divided red lead with a solution of a chloroprene polymer in a volatile organic solvent to form a paste, evaporating the solvent until a friable material is obtained, forcing the friable material through a screen to cause granulation, and thereafter evaporating the remaining solvent to obtain the granular material. Chloroprene polymers capable of being dissolved in an organic solvent without milling are preferred. The specific graining agent preferred for use in this invention is a modified thiuram disulfide-stabilized chloroprene polymer obtained by polymerization at 10° C. in an aqueous emulsion in the presence of an aliphatic mercaptan.

Only a small amount of the chloroprene polymer, i. e. 0.2 to 1.0% by weight based on the red lead, is required to produce strong granular particles. A non-flammable solvent, specifically carbon tetrachloride, is preferred. Evaporation of enough solvent to produce a friable material is necessary because extrusion would occur if the paste were forced through the screen. The size of the red lead particles obtained is determined by the size of the holes through which the friable material is forced. Silk bolting cloth screens of 62 mesh/in. to 23 mesh/in. are used to produce maximum particle sizes of 0.0125 in. to .0403 in., respectively. The granular material produced is hard and fluid enough to be used in volumetric charging equipment.

The weight percent of the solutions of the chloroprene polymer in solvents may be varied over an infinite range and is limited only by practical considerations. The following examples illustrate specific embodiments of the method of carrying out the present invention. It should be understood, however, that they are illustrative only and are not to be taken as limiting the invention in any way.

Example 1

Ten cc. of a solution of 5 grams of the thiuram disulfide-stabilized chloroprene polymer in 100 cc. of carbon tetrachloride was added to powdery red lead having a large proportion of sub-sieve particles (usually measured in microns) and a consistency similar to that of baking flour, the paste formed was heated slightly until the mass became friable and the friable mass was then forced through a 42 mesh/in. bolting cloth screen. The mixture was heated at 60° C. to remove the remaining carbon tetrachloride. The red lead composition thus obtained was a granular, free-flowing material having a particle size not exceeding 0.0188 in.

Red lead is used as the oxidizing agent in burning mixtures for electric blasting caps. Copending patent application Serial Number 286,601 (filed May 2, 1953, by Noddin and Spaeth, now U. S. Patent 2,717,204) discloses a boron-red lead mixture for use in electric blasting caps. Graining of the red lead alone or of the boron-red lead mixture is disclosed. However, the preferred graining agent, a synthetic liquid polysulfide having an average molecular weight of 4000, is not entirely satisfactory because the polysulfide-grained mixtures are not stable under conditions of hot humid storage. Moreover, a slowdown in the burning rate of these compositions over that of ungrained mixtures has been observed.

I have found that a smaller amount of the thiuram disulfide-stabilized chloroprene polymer preferred for use in this invention is required to produce grains of a strength equal to that of the polysulfide-grained boron-red lead mixtures. Small amounts of graining agent are desirable because graining agents generally form gaseous products when subjected to decomposition by flame. The chloroprene polymer-grained boron-red lead mixtures not only are stable under conditions of hot humid storage but also have burning rates comparable to those of ungrained mixtures. The burning composition to be grained generally contains red lead, a small amount, i. e., 0.5 to 3.0%, of amorphous boron, and may include, if desired, up to 60% of silicon.

The following examples of improved boron-red lead burning mixtures illustrate specific embodiments of carrying out the present invention. It should be understood that they are not to be taken as limiting the invention in any way.

Example 2

The red lead composition (99.4 parts by weight of red lead) prepared in Example 1 was mixed with 0.6 part of boron and the mixture, which contained 0.5% by weight of the chloroprene polymer, was stored at 60° C. and 100% relative humidity for 21 days. Delay blasting caps containing this composition had burning rates comparable to those containing the same delay mixture before exposure to hot humid storage.

Example 3

An intimate mixture of 98.5 parts by weight of red lead and 1.5 parts of boron was treated with 10 cc. of a carbon tetrachloride solution containing 2% thiuram disulfide-stabilized chloroprene polymer. The paste formed was mixed at room temperature until a friable mass was obtained, the friable mass forced through a 62 mesh/in. screen and the carbon tetrachloride evaporated at 60° C. The boron-red lead composition, which had a particle size not exceeding .0125 in., contained 0.2% by weight of the chloroprene polymer. The grained mixture was stored for 25 days at 60° C. and 100% relative humidity. Delay caps utilizing this exposed mixture as the delay material gave burning rates essentially the same as caps made from the same mixture which had not been exposed to adverse storage conditions.

Example 4

One hundred grams of a mixture containing 1.5 parts by weight of boron, 30 parts of silicon and 70 parts of red lead was treated with 10 cc. of a carbon tetrachloride solution containing 5% chloroprene polymer. The paste formed was worked at room temperature under a moving current of air until a friable mass was obtained, the friable mass was passed through a 62 mesh/in. screen and the carbon tetrachloride evaporated at 60° C. The boron-silicon-red lead composition, which had a grain size not exceeding 0.0125 in., contained approximately 0.5% by weight of the chloroprene polymer. The grained mixture packed in lead delay carriers 0.125, 0.350, 0.575, and 0.780 in. long gave average delay times of 23, 56, 79, and 115 ms. respectively when used in electric delay blasting caps.

*Example 5*

A mixture of 1.5 parts of boron and 98.5 parts of red lead containing 0.5% by weight of the chloroprene polymer and having a particle size not exceeding 0.0125 in. was obtained by the process described in Example 2. The grained mixture was stored at 60° C. and 100% relative humidity for 3 months. No significant change in delay time was noted in standard 60-ms. delay electric blasting caps which used the exposed chloroprene polymer-grained composition. An average delay time of 61 ms. was noted for caps which used the exposed mixture as compared to an average delay time of 60 ms. for caps which used the same mixture before exposure. An increase in delay time (from 70 to 164 ms.) was noted in similar electric blasting caps containing a 1.5/98.5 boron/red lead mixture grained with a synthetic liquid polysulfide of an average molecular weight of 4000 and stored at 60° C. and 100% relative humidity for 70 days.

As can be seen in the foregoing examples, the red lead can be grained alone or mixtures of red lead with other materials, e. g. boron and/or silicon, can be grained. Although the invention has been described in detail in the foregoing description, it will be apparent that many variations can be made without departing from the basic invention concept. I intend, therefore, to be limited only by the following claims.

I claim:

1. A red lead composition of improved flowing properties consisting essentially of red lead and a thiuram disulfide-stabilized chloroprene polymer obtained by polymerization at 10° C. in an aqueous emulsion in the presence of an aliphatic mercaptan, said chloroprene polymer being present in the amount of 0.2–1.0% by weight based on the red lead.

2. A red lead composition of improved flow quality consisting essentially of red lead and 0.2 to 1.0% of a thiuram disulfide-stabilized chloroprene polymer obtained by polymerization at 10° C. in an aqueous emulsion in the presence of an aliphatic mercaptan.

3. A process for producing red lead having improved flowing qualities consisting essentially of adding to red lead a solution of a thiuram disulfide-stabilized chloroprene polymer (obtained by polymerization at 10° C. in an aqueous emulsion in the presence of an aliphatic mercaptan) in carbon tetrachloride said chloroprene polymer being present in the amount of 0.2–1.0% by weight based on the red lead, heating the paste formed until a friable mass is obtained, passing the friable material through a screen of 62 to 23 mesh/in., and evaporating the remaining carbon tetrachloride.

4. A red lead composition for use in delay electric blasting caps consisting essentially of 97 to 99.5% red lead and 0.5 to 3% amorphous boron by weight in admixture with from 0.2 to 1.0% by weight of the said red lead of a thiuram disulfide-stabilized chloroprene polymer obtained by polymerization at 10° C. in an aqueous emulsion in the presence of an aliphatic mercaptan.

5. A red lead composition for use in delay electric blasting caps consisting essentially of red lead treated with from 0.2 to 1.0% by weight of said red lead of thiuram disulfide-stabilized chloroprene polymer obtained by polymerization at 10° C. in an aqueous emulsion in the presence of an aliphatic mercaptan in admixture with from 0.5 to 3% by weight based on the weight of the said red lead of amorphous boron.

References Cited in the file of this patent

UNITED STATES PATENTS

| | | |
|---|---|---|
| 1,805,214 | Hale | May 12, 1931 |
| 2,112,189 | Beyersdorfer | Mar. 22, 1938 |
| 2,416,639 | Pearsall | Feb. 25, 1947 |
| 2,478,501 | Patterson | Aug. 9, 1949 |
| 2,679,451 | Staba | May 25, 1954 |
| 2,717,204 | Noddin et al. | Sept. 6, 1955 |